(12) United States Patent
Matsumura et al.

(10) Patent No.: US 7,921,672 B2
(45) Date of Patent: Apr. 12, 2011

(54) METHOD FOR MANUFACTURING GRIN LENS

(75) Inventors: Hiroyoshi Matsumura, Saitama (JP); Taro Suzuki, Tokyo (JP); Toru Achiwa, Tokyo (JP)

(73) Assignee: Toyo Glass Co., Ltd., Tokyo (JP)

( * ) Notice: Subject to any disclaimer, the term of this patent is extended or adjusted under 35 U.S.C. 154(b) by 857 days.

(21) Appl. No.: 10/569,280

(22) PCT Filed: Apr. 12, 2005

(86) PCT No.: PCT/JP2005/007078
§ 371 (c)(1),
(2), (4) Date: Nov. 15, 2006

(87) PCT Pub. No.: WO2006/112003
PCT Pub. Date: Oct. 26, 2006

(65) Prior Publication Data
US 2007/0160854 A1    Jul. 12, 2007

(51) Int. Cl.
*C03B 8/00* (2006.01)
(52) U.S. Cl. .......................... 65/17.2; 65/440
(58) Field of Classification Search .............. 65/17.2, 65/440
See application file for complete search history.

(56) References Cited

U.S. PATENT DOCUMENTS

| | | | | |
|---|---|---|---|---|
| 4,943,542 A | * | 7/1990 | Hayashi et al. | 501/12 |
| 5,182,236 A | * | 1/1993 | Caldwell et al. | 501/12 |
| 5,254,508 A | | 10/1993 | Kirkbir et al. | |
| 5,818,644 A | * | 10/1998 | Noda | 359/642 |

FOREIGN PATENT DOCUMENTS

JP    60-65739    4/1985
(Continued)

OTHER PUBLICATIONS

Machine Translation of JP 05-178622, Shiro Konishi, Production of Quartz Glass Having Refractive Index Distribution, 1993.*
P.B.O. O'Connor, et al., Electronics Letters, Mar. 31, 1997, vol. 13. No. 7, pp. 170-171.

(Continued)

*Primary Examiner* — Queenie Dehghan
(74) *Attorney, Agent, or Firm* — Wenderoth, Lind & Ponack, L.L.P.

(57) ABSTRACT

A method for manufacturing a GRIN lens includes the steps of forming a wet gel provided with a concentration distribution having a different concentration of a refractive index distribution imparting metal that differs in concentration in a radial direction, drying the wet gel to form a dry gel having a bulk specific gravity $\rho$ (g/cm$^3$), sintering the dry gel to form a GRIN lens base material and stretching the GRIN lens base material while heating. The method is characterized in that, in the step of sintering the dry gel, partial pressures of oxygen during sintering at 800° C. or higher are $10^{-1}$ Pa or lower and also the relation between a rate of temperature increase v (° C./hr) and a bulk density $\rho$ of the dry gel during sintering at 1,000 to 1,150° C. is defined by $v \leq 10^5 * \mathrm{EXP}(-12\rho)$. As a result of this, the GRIN lens, which has a large numerical aperture and a small diameter, can stably and easily be manufactured.

12 Claims, 2 Drawing Sheets

○ no foaming
◐ a small number of foaming
◑ a large number of foaming
● heavy foaming

FOREIGN PATENT DOCUMENTS

| | | |
|---|---|---|
| JP | 62-119120 | 5/1987 |
| JP | 62-119122 | 5/1987 |
| JP | 5-178622 | 7/1993 |
| JP | 5-82332 | 11/1993 |
| JP | 7-507033 | 8/1995 |
| JP | 2002-258007 | 9/2002 |
| WO | 2004/000174 | 12/2003 |
| WO | 2005/001445 | 1/2005 |

OTHER PUBLICATIONS

Japanese Office Action issued Dec. 1, 2009 in connection with corresponding Japanese Patent Application No. 2006-519030, and English translation thereof.

Japanese Office Action mailed Aug. 24, 2010 in corresponding Japanese patent Application No. 2006-519030 (with English translation).

\* cited by examiner

METHOD FOR MANUFACTURING GRIN LENS

BACKGROUND OF THE INVENTION

1. Technical Field

The present invention relates to a graded index optical device which can particularly be applied to an optical device such as an optically coupled component for optical communication, a camera, an endoscope or the like, and a method for manufacturing the graded index optical device by a sol-gel process.

2. Description of Related Art

A graded index optical device has received attention, for example, as a lens having a small spherical aberration used when radiant light from a semiconductor laser is made highly efficiently incident on an optical fiber, and also, as a lens for image transmission of a camera or the like since an edge face of the lens is smooth and an optional focal length can be provided by changing the length of a circular cylinder. In particular, the shape is compact and cylindrical, thus it has been employed as a lens that is easily aligned with an axis of an optical system, easily retained and has high assembly performance. As shown in FIG. 1, this cylindrical graded index optical device (Graded Index lens, hereinafter abbreviated as "GRIN lens") is a rod lens which continuously changes by a square curve when a refractive index n in cross sectional directions x and y is expressed by the following equation (1), and the function of the lens is performed by this refractive index distribution:

$$n = n_0(1 - g^2 r^2/2) \qquad (1)$$

where g is a constant representing light-condensing performance of the GRIN lens, $n_0$ is a refractive index of a GRIN lens material, and r is a radial direction given by $r^2 = x^2 + y^2$.

As shown in FIG. 1, when a is a radius of the GRIN lens and $n_a$ is a refractive index at a radius a, the constant g is expressed by $g = NA/an_0$.

Note that a NA is expressed by $NA = (n_0^2 - n_a^2)^{1/2}$ (2).

In this equation, the NA is the square root of a difference of two squares in the center and on the periphery of the GRIN lens, is referred to as a Numerical Aperture (hereinafter referred to as "NA"), and is an important parameter representing lens performance. A lens with a high NA is a lens having high light-condensing performance, and in other words, the lens characteristics are excellent. At present, a GRIN lens which has become commercially practical has a NA of about 0.2. Therefore, there is a strong desire to provide a GRIN lens that has a NA$\geq$0.4 for making the radiant light from the semiconductor laser highly efficiently incident on the optical fiber, and also has a small diameter for miniaturizing an optical device.

As a method for making the GRIN lens, an ion exchange process, a vapor phase CVD (Chemical Vapor deposition) process, a sol-gel process or the like is known. However, a GRIN lens made by the ion exchange process is multicomponent glass containing an alkali component. Hence, this GRIN lens can not provide a large NA, and further is poor in reliability because of a problem of heat resistance due to a very large coefficient of thermal expansion of a glass material. Further, the vapor phase process obtains a NA of 0.38 on an experimental level (see for example, P. B. O'Connor et al., Electron Lett., 13, (1977) 170-171). However, in order to obtain a NA of 0.38 or more, it is necessary to increase loads of additives ($GeO_2$, $P_2O_5$ or the like). As a result of this, the coefficient of thermal expansion of the glass material becomes large, a base material tends to easily crack and air bubbles are easily generated during vitrification, thus this process is too unstable for practical use. Among others, a method for making glass by the sol-gel process that is capable of accurately forming a desired concentration distribution is effective.

On the other hand, since the sol-gel process is a synthesis method performed at a low temperature, the concentration distribution of a refractive index distribution imparting metal can precisely be formed, thus it is an effective process. In the method for making glass by the sol-gel process, an alcoholic solution including an alkoxide of silicon as a main component is added to acids or bases as solvents and hydrolysis is performed to make sol. When the multicomponent glass is made, a metal component is further added and this sol is further subjected to a polycondensation reaction, thus a crosslinking reaction proceeds to make a wet gel. Then, the obtained wet gel is dried, the solvent in the gel is removed, and thereafter, the gel is sintered to thereby make dense glass.

When the GRIN lens is made using the sol-gel process, it is necessary to form the concentration distribution on a refractive index distribution imparting a metal component. As other such methods, there is known a method using a metal salt as a raw material of a metal component, a molecular stuffing method, and further a method using a metal alkoxide. In a method for introducing the metal component using metal salt to form a refractive index distribution, gel added with the metal salt as an aqueous solution or an alcoholic solution during preparation of sol is prepared. The gel is present in a state in which the metal salt is dissolved in a solvent in a pore formed of a skeleton of silicon. The obtained gel is immersed in alcohol with a low molecular weight, water, a mixed solution thereof or the like having high solubility to the metal salt, thereby eluting the metal component contained in the gel to form the concentration distribution. However, since an appropriate salt of a metal such as Ti, Nb, Ta, Zr or the like which extensively contributes to a refractive index is not present, it was significantly difficult to apply this process to form a GRIN lens having a high NA.

In the molecular stuffing method, Japanese Examined Patent Publication No. H5-82332 discloses a method in which a wet gel is dried and sintered to make a porous body, and the porous body is immersed in a Ti containing solution or the like to uniformly impregnate it with a metal component, thus metal containing glass such as $SiO_2$—$TiO_2$ or the like is obtained. However, in this method, since a dry gel is thermally treated with a high temperature, a bonding hand of Si—O—Si is securely bonded and a reactive Si—OH group becomes few in number, thus only a very few metal components can bond to Si—O—Si, therefore it was difficult to stably make a GRIN lens with a high NA.

In the method using the metal alkoxide, gel is made in which the metal alkoxide as a component for enhancing a refractive index is added to an alkoxide of silicon as an alcoholic solution during preparation of sol. Since the gel using the metal alkoxide forms a bond between silicon and a metallic atom, in order to form a concentration distribution on a metal component, this method cleaves the bond between silicon and the metallic atom, immerses the gel in a concentration distribution imparting solution capable of eluting the metal component, washes an eluted liquid, then fixes the concentration distribution, and carries out washing, drying and sintering. In the method using this metal alkoxide, in particular, when $SiO_2$—$Ta_2O_5$ or $SiO_2$—$TiO_2$ quartz glass is selected, a GRIN lens having a high NA can stably be produced. However, to manufacture the GRIN lens, it is necessary to perform each process of eluting the metal component in the gel, washing, drying and sintering while carrying a porous gel that is easily cracked by mechanical shock and is also easily shrunken by applying heat. In particular, it is significantly difficult to accurately and stably manufacture a GRIN lens having a small diameter of 1 mm or smaller without cracking, and thus it has been impossible to commercially mass-manufacture. Conventionally, this method has been capable of mass-manufacturing a diameter of about 10 mm at a wet gel stage, a diameter of about 5 mm at a dry gel stage, and a diameter of about 2 to 3 mm at a stage sintered into the GRIN lens.

Patent Document 1: Japanese Examined Patent Publication No. H5-82332

Non-patent Document 1: P. B. O'Connor et al., Electron Lett., 13, (1977) 170-171

SUMMARY OF INVENTION

It has been desired to produce a GRIN lens that has a large numerical aperture NA and a small diameter of 1 mm or smaller. To solve this problem, it is considered that first, a GRIN lens base material of $SiO_2$—$Ta_2O_5$ or $SiO_2$—$TiO_2$ system quartz glass having a large diameter (for example, about 4 to 5 mm in diameter) is made by a sol-gel process using a metal alkoxide, next the base material is inserted into, for example, an electric furnace of a carbon heater and stretched at 1,800 to 2,000° C. to make a small diameter GRIN lenticular optical fiber having a diameter of 1 mm or smaller, and then the fiber is cut into an appropriate length and grinded to make the GRIN lens. However, when the GRIN lens base material is re-heated at high temperatures of 1,800 to 2,000° C., the base material normally foams and can not be stretched, and thus the small diameter GRIN lenticular optical fiber was unable to be stably produced.

The present invention relates to a small diameter GRIN lens in which a large diameter GRIN lens base material having a large numerical aperture NA and a refractive index distribution of which is a square curve is made by a sol-gel process, and thereafter, the base material is stretched in a heating furnace such as an electric furnace or the like. In particular, an object of the present invention is to manufacture a GRIN lenticular optical fiber without foaming during stretching.

MEANS FOR SOLVING PROBLEM

The present invention is a method for manufacturing a GRIN lens comprising the steps of: forming a wet gel that has a concentration distribution having a refractive index distribution imparting metal that differs in concentration in a radial direction, drying the wet gel to form a dry gel with a bulk specific gravity $\rho$ (g/cm$^3$), sintering the dry gel to form a GRIN lens base material and stretching the GRIN lens base material while heating. The method for manufacturing the GRIN lens is characterized in that, in the step of sintering the dry gel, partial pressures of oxygen are $10^{-1}$ Pa or lower during sintering at 800° C. or higher, and also during sintering at 1,000 to 1,150° C., the relation between a rate of temperature increase v (° C./hr) and a bulk density $\rho$ is defined by $v \leq 10^5 * EXP(-12\rho)$.

In the present invention, the bulk specific gravity $\rho$ of a dry gel denotes a value that divides weight (g) of the dry gel by volume (cm$^3$). Also, EXP($-12\rho$) denotes e ($=2.71828\ldots$) to the power $-12\rho$.

Also, the present invention is characterized in that, in the above-described step of sintering the dry gel, the sintering at 800° C. or higher is performed in a helium atmosphere, thereby providing partial pressures of oxygen of $10^{-1}$ Pa or lower.

The present invention is also characterized in that the refractive index distribution imparting metal is selected from the group consisting of titanium and tantalum.

(Claim 4) The present invention is also a GRIN lens which is characterized by manufacturing using a manufacturing method as described above.

A composition component of gas in an air bubble foaming when a GRIN lens base material of $SiO_2$—$TiO_2$ system quartz glass was subjected to wire drawing and heating was examined to find that a main gas causing foaming is (1) $H_2O$ and (2) $O_2$. A case in which a refractive index distribution imparting metal is titanium (Ti) will be described below. However, since cases of other refractive index distribution imparting metals are also similar, only the $SiO_2$—$TiO_2$ quartz glass will be described.

The cause of foaming by (1) $H_2O$ is as follows: A hydroxyl group (Si—OH) chemically adsorbed on the surface of a pore of gel is not removed by heating from room temperature to 800° C. in a sintering stage. Further, when the sintering is continued to temperatures in the region of 1,200° C. and a dry gel is vitrified, since a silica dry gel with a relatively large bulk density ($\geq 1.1$ g/cm$^3$) has low vitrification temperatures (up to 1,000° C.), the vitrification of the dry gel is completed before the —OH group is released to the exterior, thus the —OH group is incorporated into the glass. In particular, when a glass base material containing the —OH group of 4,000 ppm or more is inserted into the electric furnace, and heating and stretching are carried out at 1,800 to 2,000° C., depending on the amount of the —OH group incorporated into the glass, foaming often occurs. However, upon further consideration, it has become apparent that, when the dry gel with a low bulk density ($\leq 0.9$) is sintered, since the vitrification temperatures of the dry gel become high (up to 1,150° C.), in a sintering stage at 1,000 to 1,200° C., the —OH group is released to the exterior of the dry gel through a vacant hole before the vitrification of the dry gel is completed, and even if high temperature heating is applied, foaming caused by $H_2O$ disappears. It is important to release the —OH group to the exterior of the dry gel until the vitrification is completed and to gradually increase a rate of temperature increase during sintering at 1,000 to 1,150° C. for actively promoting release of the —OH group to the exterior of the dry gel.

The cause of foaming by $O_2$ is as follows: A GRIN lens base material containing Ti as a refractive index distribution imparting metal is in a heterogeneous state in which $TiO_2$ is localized. When this is heated at 1,800 to 2,000° C. and stretched, a decomposition reaction, in which $TiO_2$ in the base material becomes $TiO_2 \rightarrow TiO + \frac{1}{2}O_2$ occurs, thus $O_2$ is generated to cause foaming. The decomposition reaction expressed by $TiO_2 \rightarrow TiO + \frac{1}{2}O_2$ occurs at about 1,500° C., thus this decomposition reaction does not occur in a stage of sintering a dry gel (about 1,200° C. or lower). However, it has become apparent that, in a stage of sintering and vitrifying the dry gel, when partial pressures of oxygen are provided at $10^{-1}$ Pa or lower during sintering at 800° C. or higher, the decomposition reaction of $TiO_2 \rightarrow TiO + \frac{1}{2}O_2$ by this localized $TiO_2$ occurs at about 1,000 to 1,100° C. As a result of this, when a gel ($\leq 0.9$ g/cm$^3$) added with Ti having a relatively large bulk density is used, since vitrification temperatures of the dry gel are 1,000° C. or lower, $O_2$ generated by the decomposition reaction is not removed during sintering and is incorporated into glass of the dry gel, and when heating and stretching are carried out, foaming occurs. However, when a gel with a low bulk density ($\leq 0.9$) is sintered, since a vitrification temperature of the dry gel increases to about 1,100 to 1,150° C., $O_2$ generated by the decomposition reaction is released to the exterior of the dry gel before the dry gel is vitrified. Hence, even if heating and wire drawing are carried out, foaming does not occur. It is important to remove $O_2$ generated by the decomposition reaction from the glass before the dry gel is vitrified and to gradually increase a rate of temperature increase, particularly, during sintering at 1,000 to 1,150° C. for actively promoting release of $O_2$ generated by the decomposition reaction to the exterior of the dry gel.

As has been described, to suppress foaming during heating at high temperature at which a GRIN lens base material is stretched, the following three conditions hold the key: (1) A bulk density of a dry gel forming the GRIN lens base material is made low and the vitrification temperature thereof is increased, (2) partial pressures of oxygen during sintering at 800° C. or higher are decreased to $10^{-1}$ Pa or lower, and (3) a rate of temperature increase during sintering at 1,000 to 1,150° C. is increased as gradually as possible and before gel is vitrified so that an —OH group and $O_2$ generated by a decomposition reaction are made to release to the exterior.

EFFECTS OF THE INVENTION

According to the present invention, a GRIN lens having a large numerical aperture and a small diameter can efficiently and easily be manufactured. The GRIN lens of the present invention can provide, for example, a small diameter of 1 mm or smaller, and thus an optical device such as an optical fiber collimator or the like can be miniaturized. Further, when the GRIN lens is deposited on the tip end of an optical fiber, the axis of the GRIN lens and the optical fiber is automatically consistent with each other due to a self-alignment effect caused by the surface tension of molten glass, thus manufacture becomes significantly easy.

DETAILED DESCRIPTION OF THE INVENTION

Figure 1:
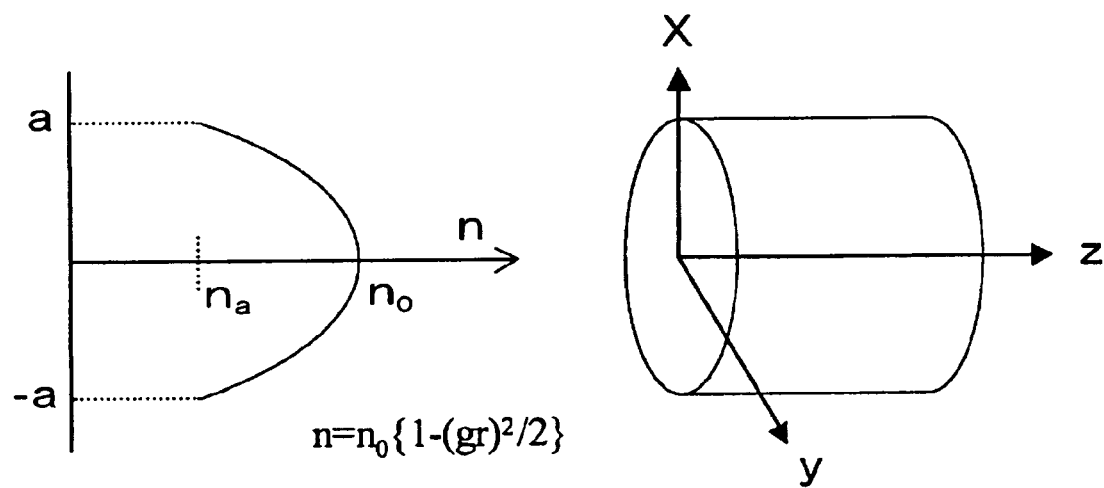
FIG. 1 is a diagram illustrating a refractive index distribution of a GRIN lens.

A procedure for making a GRIN lens base material by a sol-gel process using a metal alkoxide will briefly be described. A case in which a refractive index distribution imparting metal, which is titanium (Ti), will be described. However, cases using other refractive index distribution imparting metals are also similar. First, during preparation of sol, an alkoxide of Si partially hydrolyzed by a small amount of $H_2O$ is added with the metal alkoxide of Ti as a component to enhance a refractive index in conjunction with an alcoholic solution and agitation is carried out, thereafter $H_2O$ is added to prepare a sol liquid, and thus a wet gel is made. In the wet gel using the metal alkoxide of Ti, since Si and Ti atoms form bonds, in order to form a concentration distribution on a Ti component, the bonding between Si and Ti atoms is cleaved, the wet gel is immersed in a concentration distribution imparting liquid (hydrochloric acid aqueous solution) which can elute the Ti component. An eluted liquid in the wet gel is washed and removed, and thereafter drying is carried out to make a dry gel, and the dry gel is sintered and vitrified. To form the concentration distribution on the Ti component, it is necessary that the wet gel is immersed in the concentration distribution impairing liquid (hydrochloric acid aqueous solution), the bonding between Si and Ti atoms is cleaved, and the Ti component is eluted. A bulk density of the dry gel in which the Ti component is eluted, and washing and drying are carried out, is different by a Ti concentration and an elution condition of the Ti component. The dry gel is made under various elution conditions and a result of measuring the bulk density thereof is shown in Table 1. Sample numbers 1 and 6 are not immersed in the hydrochloric acid aqueous solution, and more specifically, these are solid glass without forming the GRIN lens. Sample numbers 3 and 9 are the GRIN lens immersed in hydrochloric acid for a predetermined time, then washed and repeatedly immersed in hydrochloric acid a plurality of times for a predetermined time. A principle to be used is to cleave the bonding relation between the Ti component in a wet gel skeleton and a Si skeleton, and to make elution for providing the concentration distribution on the Ti component, and thus on the periphery of the wet gel, a cleavage reaction of a skeleton structure proceeds by acid immersion for a long time, and the skeleton of the wet gel suffers considerable damage. To reinforce this wet gel structure, it is necessary to provide a gel structure having a small particle, increase the number of crosslinking points between the particles, and preventing the wet gel structure from degrading even if the acid immersion is performed for a long time, and thus in sample numbers 1 and 6, the bulk density is inevitably high.

TABLE 1

| Sample No. | Concentration of Si mol % | Concentration of Ti mol % | Concentration of Hydrochloric Acid Solution N | Immersion Time of Hydrochloric Acid hr | Bulk Density g/cm³ |
|---|---|---|---|---|---|
| 1 | 85 | 15 |  | 0 | 1.00 |
| 2 | 85 | 15 | 1.5 | 6 | 0.75 |
| 3 | 85 | 15 | 1.5 | 4 | 0.70 |
|  |  |  | 1.5 | 4 |  |
| 4 | 85 | 15 | 3 | 6 | 0.70 |
| 5 | 85 | 15 | 6 | 6 | 0.65 |
| 6 | 80 | 20 |  | 0 | 1.25 |
| 7 | 80 | 20 | 1.5 | 6 | 1.13 |
| 8 | 80 | 20 | 1.5 | 12 | 1.05 |
| 9 | 80 | 20 | 1.5 | 4.5 | 0.84 |
|  |  |  | 1.5 | 3 |  |
|  |  |  | 1.5 | 3 |  |

As apparent from Table 1, it was found that, if samples are immersed in the hydrochloric acid aqueous solution and the Ti component is eluted, a bulk density of the dry gel becomes low, and as the immersion time becomes longer, as a concentration of the hydrochloric acid solution becomes higher and as the number of immersion times increases, the bulk density becomes lower as compared with a solid dry gel formed without immersing. The condition (1), which is a first condition among three conditions for preventing foaming, is to reduce the bulk density of the dry gel that forms the GRIN lens base material. In immersion in hydrochloric acid, which is a concentration distribution imparting liquid of Ti, the bulk density can be reduced to about 0.65 g/cm³ by controlling the concentration of Ti, the concentration of hydrochloric acid, the immersion time and the number of immersion times. A decision on which to select as a preferable condition is made by a concentration distribution form (close to square distribution form) of the bulk density of the dry gel and the Ti component of the GRIN lens base material.

Further, the condition (2), which is a second condition among three conditions, is to reduce partial pressures of oxygen of $\leq 10^{-1}$ Pa. This can easily be achieved by sufficiently filling an atmosphere in a sintering furnace with a He gas and reducing the partial pressures of oxygen during sintering of the dry gel at 800° C. or higher. The He gas can release an oxygen gas generated by a decomposition reaction of $TiO_2$ from the dry gel or glass in a short time during the course of the process of vitrifying the dry gel, and hence the He gas is most preferable.

Figure 2:
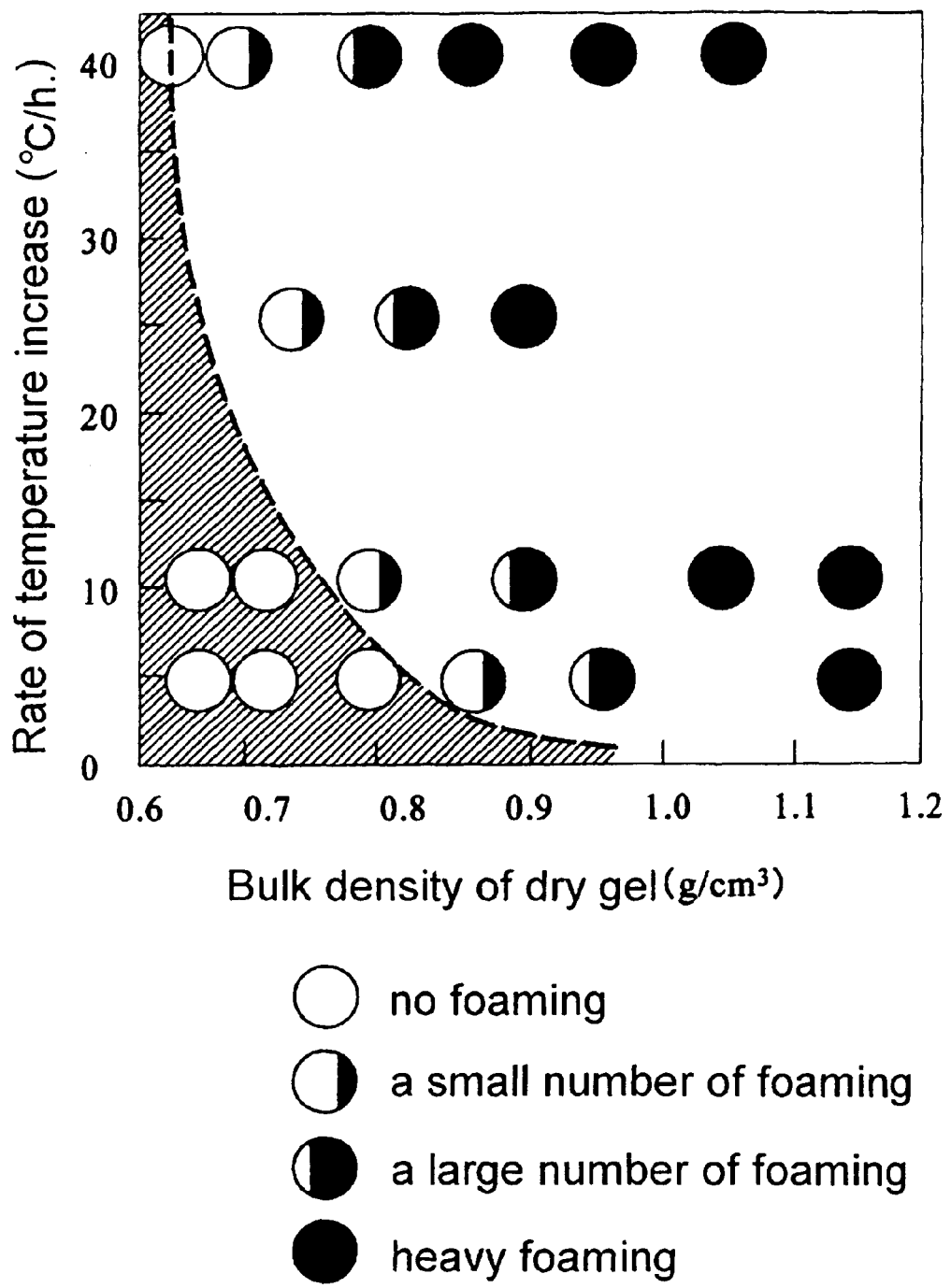
FIG. 2 is a diagram illustrating the relation between a rate of temperature increase and a bulk density of a dry gel.

Next, the dry gel having various bulk densities was heated at a rate of temperature increase of 100° C./hr. in an $O_2$ atmosphere to remove a hydrocarbon compound in the dry gel at temperatures up to from room temperature to 800° C., and thereafter, at temperatures up to 800 to 1,200° C., the $O_2$ atmosphere is replaced with a He atmosphere to set the partial pressures of oxygen at $10^{-1}$ Pa or lower, and the rate of temperature increase was changed to perform sintering and vitrification. Then, the sintered glass is heated to a high temperature of 2,000° C. at which the sintered glass can be stretched, and whether foaming or not was verified. The result thereof is shown in FIG. 2. A white circle, a black circle or the like represents the level of foaming when the sintered glass is heated to a stretchable temperature of 2,000° C., and an increase in the black coated part shows that foaming appears frequently. As is apparent from FIG. 2, as the rate of temperature increase becomes faster, the foaming appears more frequent, and also as the bulk density becomes smaller, the foaming is suppressed, thus it was found that with respect to foaming, a mutual relation is present between the rate of temperature increase and the bulk density of the dry gel. That is, if sintering is performed in the triangular shaped area shown in FIG. 2, foaming does not appear at all and stretching can stably be performed. This triangularly shaped area can approximately be expressed by an equation (3). Note that v is a rate of temperature increase (° C./hr.) and ρ is a bulk density (g/cm³).

$$v \leq 10^5 * EXP(-12\rho) \quad (3)$$

Note that, in this experiment, at temperatures up to 800 to 1,200° C., the rate of temperature increase was fixed. However, an important temperature area is 1,000 to 1,150° C., hence in a temperature area other than thereof, the temperature may be increased at about 40° C./hr.

In the present invention, a refractive index distribution imparting metal selected from the group consisting of Ti (titanium), Ta (tantalum), Sb (antimony) and Zr (zirconium) is preferable, since a NA can be made high and also a coefficient of thermal expansion is close to quartz glass of an optical fiber. More preferable metals are Ti and Ta which can stably make and sinter the wet gel and the dry gel. That is, in glass formed with Sb, the Sb, which is an additional element, evaporates during sintering of the gel, and in glass formed with Zr, a hydrolysis reaction proceeds relatively fast and a small amount of precipitation is formed in methanol, which is a solvent, during the course of the process of making the gel, and thus these metals have instability from a process viewpoint.

Example 1

64.7 g of tetramethoxysilane (TMOS) was combined with 39.16 g of ethanol, 18.27 g of dimethylformamide (DMF) and further 7.76 g of 0.056 N hydrochloric acid, and mixed. Thereafter, 25.53 g of titanium tetrabutoxide was combined with 39.74 g of ethanol and 18.27 g of DMF was dripped and mixed while agitating. The solution was dripped with 28.37 g of distilled water (water) and 24.76 g of ethanol, and mixed to make a sol liquid. This sol liquid was poured in a test tube having an inner diameter of 14 mm, sealed with aluminum foil, then placed in a thermostatic chamber at 60° C. for 5 days, and aged. Gel completing the aging process was immersed in 1.5 N hydrochloric acid for 3 hours to form a concentration distribution on a Ti component, then immersed in water for 24 hours and washed. The washed wet gel was repeatedly immersed in 1.5 N hydrochloric acid for 6 hours to form the concentration distribution on the Ti component, then immersed in ethanol for 24 hours and washed. The gel completing the washing process was removed, placed in the thermostatic chamber at 60° C. for 5 days and in the thermostatic chamber at 120° C. for 5 days, and dried. The bulk density of the dried gel was 0.73 g/cm³, and was relatively small. This dry gel was placed on a quartz tube divided in half and inserted into a sintering furnace. At temperatures ranging from room temperature to 450° C., the temperature was increased at 100° C./hr in an oxygen atmosphere, then the temperature was kept at 450° C. for 2 hours in the oxygen atmosphere, and at temperatures of 450 to 800° C., the temperature was increased at 20° C./hr in the oxygen atmosphere. At temperatures of 800 to 1,000° C., the temperature was increased at 10° C./hr in a helium atmosphere, and at temperatures of 1,000 to 1,150° C., the temperature was increased at 5° C./hr in the helium atmosphere. At temperatures of 1,000 to 1,150° C., a gas exhaust part of a sintering furnace was sealed, a hole with a diameter of about 10 mm was open, and partial pressures of oxygen were held at $\leq 10^{-1}$ Pa. Thereafter, the temperature was increased to 1,200° C., sintering was performed, and a transparent and cylindrical (4.2 mm in diameter) GRIN lens base material was obtained. As a result of measuring a refractive index distribution of this base material, the GRIN lens base material having NA=0.47 in which the refractive index distribution decreases from a center to a periphery by nearly a square curve was obtained.

As a result of spinning (stretching) this base material into a GRIN lenticular optical fiber having an outer diameter of 150 μm while inserting into an electric furnace of a carbon heater at 0.004 mm/s, a non-foaming and stable GRIN lenticular optical fiber was obtained. A refractive index distribution of this GRIN lenticular optical fiber was measured to find the GRIN lenticular optical fiber having NA=0.46 in which the refractive index distribution decreases from a center to a periphery by nearly a square curve. As a result of cutting this GRIN lenticular optical fiber into a length of 350 μm and grinding, a GRIN lens was obtained having the function of a convex lens with a focal length of 164 μm and a small diameter.

In this example, a rate of temperature increase v is 5° C./hr at 1,000 to 1,150° C. and $10^5 * EXP(-12\rho)$ is 15.69, thus the relation given by $v \leq 10^5 * EXP(-12\rho)$ is satisfied.

Comparative Example 1

A wet gel similarly prepared as in Example 1, was immersed in 1.5 N hydrochloric acid for 3 hours to form a concentration distribution on a Ti component, thereafter without carrying out a second immersion thereof, immersed in water for 24 hours and in ethanol for 24 hours, and washed. After completion of the washing process, the gel was removed, and placed in a thermostatic chamber at 60° C. for 5 days and in the thermostatic chamber at 120° C. for 5 days, and dried. The dry gel had a bulk density of 0.85 g/cm³. As a result of sintering the dry gel similarly to Example 1, and heating the obtained transparent glass body to 2,000° C., a small number of air bubbles appeared, thus stable stretching was unable to be performed.

In this Comparative Example, a rate of temperature increase v is 5 (° C./hr.) at 1,000 to 1,150° C. and $10^5 * EXP(-12\rho)$ is 3.72, thus the relation given by $v \leq 10^5 * EXP(-12\rho)$ is not satisfied.

Example 2

64.7 g of tetramethoxysilane (TMOS) was added with 39.16 g of ethanol, 18.27 g of dimethylformamide (DMF) and further 7.76 g of 0.056 N hydrochloric acid, and mixed, thereafter, 41.0 g of tantalum ethoxide added with 39.74 g of ethanol and 18.27 of DMF was dripped and mixed while agitating. The solution was dripped with 28.37 g of distilled water (water) and 24.76 g of ethanol, and mixed to make a sol liquid. This sol liquid was poured in a test tube having an inner diameter of 14 mm, sealed with aluminum foil, then placed in a thermostatic chamber at 60° C. for 5 days, and aged. The gel completing the aging process was immersed in a 0.1% hydrofluoric acid aqueous solution for 6 hours to form a concentration distribution on a Ti component, then immersed in water for 24 hours and washed, and further immersed in ethanol for 24 hours and washed. The gel completing the washing process was removed, placed in the thermostatic chamber at 60° C. for 5 days and in the thermostatic chamber at 120° C. for 5 days, and dried. A bulk density of the dried gel was 0.80 g/cm³, and was relatively small. This dry gel was placed on a quartz tube divided in half and inserted into a sintering furnace. At temperatures from room temperature to 450° C., the temperature was increased at 100° C./hr in an oxygen atmosphere, then the temperature was maintained at 450° C. for 2 hours in the oxygen atmosphere, and at temperatures of 450 to 800° C., the temperature was increased at 20° C./hr in the oxygen atmosphere. At temperatures of 800 to 1,000° C., the temperature was increased at 10° C./hr in a helium atmosphere, and at temperatures of 1,000 to 1,150° C., the temperature was increased at 5° C./hr in the helium atmosphere. At temperatures of 1,000 to 1,150° C., a gas exhaust part of a sintering furnace was sealed, a hole with a diameter of about 10 mm was open, and partial pressures of oxygen were held at $\leq 10^{-1}$ Pa. Thereafter, the temperature was increased to 1,200° C., sintering was performed, and a transparent and cylindrical (4.2 mm in diameter) GRIN lens base material was obtained. As a result of measuring a refractive index distribution of this base material, a GRIN lens base material having NA=0.48 in which the refractive index distribution decreases from a center to a periphery by nearly a square curve was obtained.

As a result of spinning this base material into a GRIN lenticular optical fiber having an outer diameter of 0.8 mm while inserting it into an electric furnace of a carbon heater at 0.004 mm/s, a non-foaming and stable GRIN lenticular optical fiber was obtained. A refractive index distribution of this GRIN lenticular optical fiber was measured to find the GRIN lenticular optical fiber having NA=0.47 in which the refractive index distribution decreases from a center to a periphery by nearly a square curve. As a result of cutting this GRIN lenticular optical fiber into a length of 1.23 mm and grinding, the GRIN lens having a convex lens with a focal length of 1.05 mm and a small diameter was obtained.

In this Example, a rate of temperature increase v is 5° C./hr at 1,000 to 1,150° C. and $10^5 * EXP(-12\rho)$ is 6.77, thus the relation given by $v \leq 10^5 * EXP(-12\rho)$ is satisfied.

Comparative Example 2

A wet gel similarly made to that in Example 2 was immersed in 0.1% hydrofluoric acid aqueous solution for 2 hours, thereafter immersed in water for 24 hours and in ethanol for 24 hours, and washed. The gel completing the washing process was removed, placed in a thermostatic chamber at 60° C. for 5 days and in the thermostatic chamber at 120° C. for 5 days, and dried. The dried dry gel had a bulk density of 0.95 g/cm³. As a result of sintering this dry gel, similarly to Example 2, and heating an obtained transparent glass body to 2,000° C., a small number of air bubbles appeared, thus stable stretching was unable to be performed.

In this Comparative Example, a rate of temperature increase v is 5° C./hr at 1,000 to 1,150° C. and $10^5 * EXP(-12\rho)$ is 1.12, thus the relation given by $v \leq 10^5 * EXP(-12\rho)$ is not satisfied.

INDUSTRIAL APPLICABILITY

The GRIN lens in the present invention can be utilized as an optical fiber coupling part, a collimater or the like by depositing it on the tip end of an optical fiber.

The invention claimed is:

1. A method for manufacturing a GRIN lens comprising:
   forming a wet gel including a refractive index distribution imparting metal, the wet gel having a concentration distribution of the refractive index distribution imparting metal which varies in a radial direction;
   drying the wet gel to form a dry gel with a bulk density ρ of at least 0.6 g/cm³;
   sintering the dry gel to form a GRIN lens base material; and
   stretching the GRIN lens base material while heating the GRIN lens base material,
   wherein during the sintering operation, partial pressures of oxygen during sintering at 800° C. or higher are $10^{-1}$ Pa or lower, and
   wherein during the sintering operation, the relationship between a rate of temperature increase v in degrees Celsius per hour and the bulk density ρ in g/cm³ of the dry gel during sintering at 1,000 to 1,150° C. is given by $v \leq 10^5 * EXP(-12\rho)$.

2. The method for manufacturing the GRIN lens according to claim 1, wherein during said sintering operation, partial pressures of oxygen are made $10^{-1}$ Pa or lower by performing the sintering operation at 800° C. or higher in a helium atmosphere.

3. The method for manufacturing the GRIN lens according to claim 2, wherein the refractive index distribution imparting metal is selected from the group consisting of titanium and tantalum.

4. The method for manufacturing the GRIN lens according to claim 1, wherein the refractive index distribution imparting metal is selected from the group consisting of titanium and tantalum.

5. The method for manufacturing the GRIN lens according to claim 1, wherein the numerical aperture of the GRIN lens is more than 0.4.

6. The method for manufacturing the GRIN lens according to claim 1, wherein the numerical aperture of the GRIN lens is 0.47 to 0.48.

7. A method for manufacturing a GRIN lens comprising:
forming a wet gel including a refractive index distribution imparting metal, the wet gel having a concentration distribution of the refractive index distribution imparting metal which varies in a radial direction;
drying the wet gel to form a dry gel with a bulk density $\rho$ of at least 0.6 g/cm$^3$;
sintering the dry gel to form a GRIN lens base material; and
stretching the GRIN lens base material while heating the GRIN lens base material,
wherein during the sintering operation, temperature is increased to 1,200° C., and between temperatures of 1,000 to 1,150° C. a rate of temperature increase v in degrees Celsius per hour satisfies the expression $v \leq 10^5 * EXP(-12\rho)$, and
wherein during the sintering operation, partial pressures of oxygen at temperatures of 800° C. or higher are $10^{-1}$ Pa or lower.

8. The method for manufacturing the GRIN lens according to claim 7, wherein during said sintering operation, partial pressures of oxygen are made $10^{-1}$ Pa or lower by performing the sintering operation at 800° C. or higher in a helium atmosphere.

9. The method for manufacturing the GRIN lens according to claim 8, wherein the refractive index distribution imparting metal is selected from the group consisting of titanium and tantalum.

10. The method for manufacturing the GRIN lens according to claim 7, wherein the refractive index distribution imparting metal is selected from the group consisting of titanium and tantalum.

11. The method for manufacturing the GRIN lens according to claim 7, wherein the numerical aperture of the GRIN lens is more than 0.4.

12. The method for manufacturing the GRIN lens according to claim 7, wherein the numerical aperture of the GRIN lens is 0.47 to 0.48.

* * * * *